United States Patent
Statton

(10) Patent No.: US 6,363,886 B1
(45) Date of Patent: Apr. 2, 2002

(54) HEATED/COOLED LIVE-FOOD BIRD FEEDER

(76) Inventor: Christine J. Statton, 5601 Pettis Rd., Cochranton, PA (US) 16314-6357

( * ) Notice: Subject to any disclaimer, the term of this patent is extended or adjusted under 35 U.S.C. 154(b) by 0 days.

(21) Appl. No.: 09/619,567

(22) Filed: Jul. 19, 2000

Related U.S. Application Data

(60) Provisional application No. 60/144,621, filed on Jul. 20, 1999.

(51) Int. Cl.[7] .......................... A01K 5/00; A01K 39/00
(52) U.S. Cl. ........................................ 119/51.5; 119/73
(58) Field of Search .............................. 119/51.01, 51.5, 119/57.8, 57.92, 73, 429, 900

(56) References Cited

U.S. PATENT DOCUMENTS

| | | | | |
|---|---|---|---|---|
| 3,631,840 A | * | 1/1972 | McCormack | 119/51.12 |
| 4,259,927 A | | 4/1981 | Clarke | 119/51 |
| 4,515,108 A | | 5/1985 | Rankin, Jr. | 119/45 |
| 4,640,226 A | | 2/1987 | Liff | 119/1 |
| 4,691,664 A | * | 9/1987 | Crowell | 119/61 |
| 4,798,173 A | * | 1/1989 | Wilgren | 119/61 |
| 5,002,017 A | | 3/1991 | Hollyday et al. | 119/73 |
| 5,012,763 A | | 5/1991 | Morrison | 119/34 |
| 5,042,425 A | | 8/1991 | Frost, Jr. | 119/5 |
| 5,138,980 A | * | 8/1992 | Ewing | 119/73 |
| 5,140,134 A | * | 8/1992 | Reusche et al. | 219/441 |
| 5,156,113 A | * | 10/1992 | Sextro | 119/73 |
| 5,215,039 A | | 6/1993 | Bescherer | 119/57.8 |
| 5,269,258 A | | 12/1993 | Brown | 119/57.9 |
| 5,278,941 A | * | 1/1994 | Ward | 392/498 |
| 5,309,865 A | | 5/1994 | Hardison | 119/57.8 |
| 5,413,069 A | | 5/1995 | Currie | 119/52.2 |
| 5,718,124 A | * | 2/1998 | Senecal | 62/457.6 |
| 5,722,344 A | | 3/1998 | Rank | 119/57.8 |
| 6,205,950 B1 | * | 3/2001 | Thompson, Jr. | 119/51.5 |

* cited by examiner

Primary Examiner—Charles T. Jordan
Assistant Examiner—Kimberly S. Smith
(74) Attorney, Agent, or Firm—Wayne L. Lovercheck

(57) ABSTRACT

A bird feeder for maintaining live bird feed at a temperature to preserve the feed. The temperature is maintained within an acceptable range with heating and cooling means, which are provided in combination with the feeder. The bird feeder has a removable front for easy cleaning, an insulated base to support the feed, and entrance openings of a proper size to admit only the desired size bird.

20 Claims, 5 Drawing Sheets

US 6,363,886 B1

HEATED/COOLED LIVE-FOOD BIRD FEEDER

CROSS REFERENCE TO RELATED APPLICATIONS

This application claims the benefit of U.S. Provisional Application Serial No. 60/144,621 filed Jul. 20, 1999.

STATEMENT REGARDING FEDERALLY SPONSORED RESEARCH OR DEVELOPMENT

Not applicable

BACKGROUND OF THE INVENTION

North America is fortunate to have the world's only Bluebirds (Sialia-Sialis not to be confused with any other birds that happen to be blue). Three species of bluebirds belong to this member of the Thrush family—Eastern, Mountain, and Western Bluebirds.

In 1978, it became recognized that all three (3) bluebird populations were in severe decline. Paramount reasons for this decline are human encroachment on nesting habitat and the impact of human importation of two (2) species of non-native birds—the House Sparrow (formerly known as the English Sparrow) and the European Starling. With that recognition, a national effort was launched to save the bluebird from otherwise extinction. This effort included the formation of the North American Bluebird Society (NABS).

The effort focused primarily on establishing proper human-made nest boxes for bluebirds and controlling the proliferation of the imported species. That effort has widely grown across the United States and Canada. Although many of the nest boxes are offered on "trails" (nest boxes appropriately spaced that are offered in the 10s or even 100s covering literally miles of distance), bird lovers also offer bluebird nest boxes in their own yards.

A common outgrowth of bluebirds nesting in one's back yard is the desire to offer food. Bluebirds are primarily insectivorous. Conventional seed feeders are inappropriate resources for offering live food to bluebirds. The most common method of offering live food (e.g. mealworms) is on home-made platform feeders or by one of the commercially produced mealworm feeders.

Applicant is aware of the following U.S. Pat. Nos.: 4,259,927; 4,515,108; 4,640,226; 5,002,017; 5,012,763; 5,042,425; 5,215,039; 5,269,258; 5,309,865; 5,413,069; and, 5,722,344.

BRIEF SUMMARY OF THE INVENTION

Use of a platform style feeder results in the live food (e.g. mealworms) being subject to rain and snow, freezing temperatures, being blown off by wind, baking in the heat, or being eaten by undesirable non-target birds.

Use of the feeders that are currently commercially available may resolve wind, rain, snow and non-target bird issues. However, no currently available feeder provides any mechanism targeted at keeping the live food from freezing or baking. Additionally, the relatively small size of these feeders has been observed as seeming to make bluebirds feel trapped when inside them. Consequently, owners often leave these feeders open defeating the weather protection the feeders could offer.

The nutritional potential of live food is highest while the food remains alive until it is eaten. Additionally, often, unless actually at the point of near-starvation, bluebirds may ignore frozen (dead) mealworms and eat comparatively nutritionally-poor berries. In winter's ravages the nutrition level of the food is a paramount concern for the bluebirds since they are typically one of the earliest bird to nest—often beginning while cold weather prevails. Additionally, since bluebirders often buy mealworms (v. raise them) at a price that equates to approximately $100/lb., frozen worms that are uneaten are a significant financial loss.

Keeping live food warm and dry, ergo alive, in cold climates is a continuous concern for those who elect to offer this food to bluebirds. Thus far, the food is either metered out continuously over the course of the day, or end up frozen as the bluebird landlord places a full day's supply into the feeder in the morning, of a sub-freezing day, before leaving for work or school.

Continuous supplying of the feeder is extremely inconvenient, even if the bluebird landlord is home all day every day to do so. With the alternative, since bluebirds do not eat the full day's supply at one "sitting", placing such supply all at once results in the food freezing as the temperatures inside the feeder closely parallel ambient temperatures.

Similar efforts to keep fresh live worms available in the summer are also problematic. Dead, dehydrated mealworms are ignored by bluebirds at a time when the supplemental food source could be critical when feeding nestlings. The option to cool the worms resolves the issue of baked worms.

The heated/cooled live-food bird feeder provides heated space for live food for birds to be placed in the feeder without them freezing in sub-freezing ambient temperatures or dehydrating in hot ambient temperatures.

To keep the food warm, the bowl containing the live food is floated in a separate bowl of water. The water is warmed by a birdbath, or birdbath-type of, heater. The water bowl sits, vanity-sink style, down into an insulated base to help the economy and efficiency of using electricity.

To keep the food cool, the water bowl, filled with water, may be placed into the freezer. After the water is frozen the ice block may be popped out and stored in a plastic bag in the freezer while additional feeder ice blocks are being similarly made. Additionally, summer ventilation holes in the feeder are to be opened. Lastly, the window panels in the feeder may be opened or replaced with screen panels. Optionally, instead of actually freezing bowls of water, the bottom bowl may be lined with ice cubes or hold a frozen re-useable "ice-pack" such as is used in camping or chemically activated cooling packs. Alternatively, a small refrigerator compressor with the evaporator coil placed in the water between the two bowls or mounted directly on the bottom of the feed bowl, could be used keep the water and live bird feed cold.

To minimize non-target birds accessing the live food, entrance holes are sized to bluebirds. Therefore, only bluebird size and smaller birds can enter. Entrance by such other birds is a possibility, but one that also exists with the currently available commercially produced feeders. Birds larger than bluebird-size cannot enter the feeder. (Note: the feeder entrance holes are sized 1/16" larger than the standard nest box entrance hole sizes to minimize feather wear from repeated entry into and exit from the feeder.)

To eliminate wind, rain or snow problems, overall, the feeder is fully enclosed and under roof. Plastic (e.g. Plexiglas) panels in all four sides serve as 'windows'.

The specific construction, materials, shape, method of heating/cooling, and energy resource powering the heater of the diagramed feeder are not critical to its function. Alternative construction, materials, shape, method of heating/ cooling, and energy resources could be used.

The feeder may be made of wood or other construction materials, including, but not limited to, sheet-PVC or resin plastic or metal. The present application describes a feeder that is square in shape. However, other shapes could be used, for example, rectangular, round hexagonal, octagonal. The feeder disclosed relies on an electrically powered birdbath heater. Other heat and refrigeration sources could be used.

It is an object of the present invention to provide a heated/cooled live-food bird feeder that provides heated and cooled space for live food for birds to be placed in the feeder, without the live food freezing in sub-freezing ambient temperatures or dehydrating in hot ambient temperatures.

It is another object of the present invention to provide a removable front panel to provide access to clean or place food on the inside of the feeder.

It is another object of the invention to provide a fully enclosed, but ventilatable enclosure.

It is another object of the invention to provide additional protection from weather derived from the overhanging roof.

It is another object of the invention to provide an insulated cavity in the feeder base.

It is another object of the present invention to provide a heated/cooled live-food bird feeder that is simple in construction, economical to manufacture and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions and minor details of construction without departing from the spirit or sacrificing any of the advantages of the invention.

BRIEF DESCRIPTION OF THE SEVERAL VIEWS OF THE DRAWING(S)

DETAILED DESCRIPTION OF THE PREFERRED EMBODIMENT(S)

Figure 1:
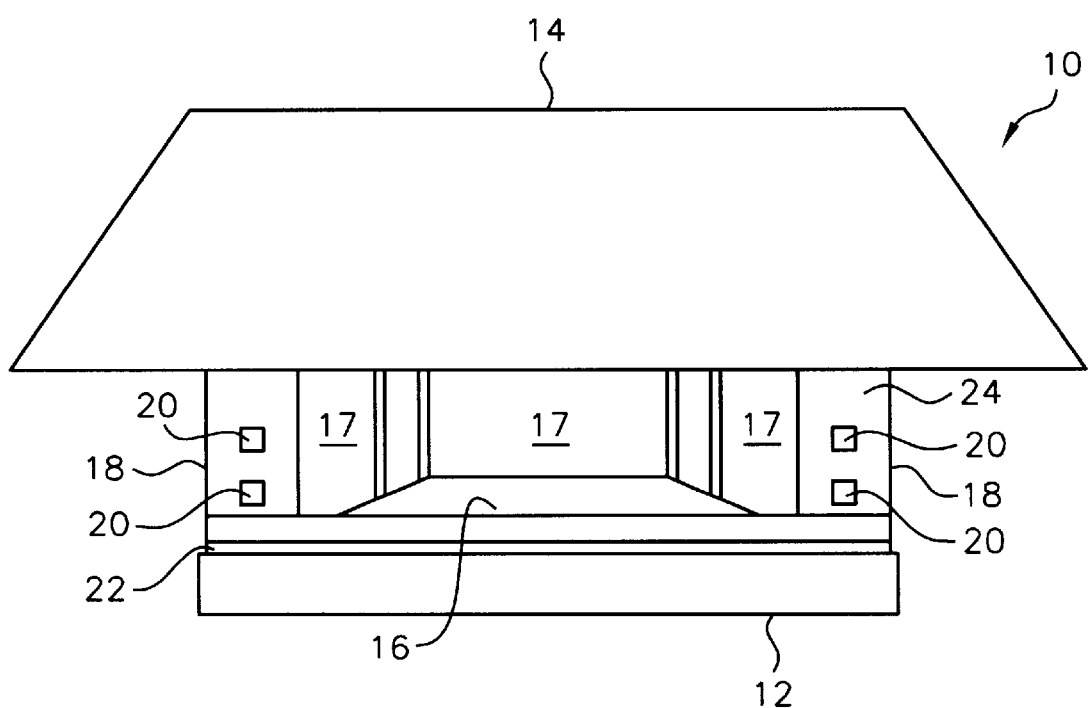
FIG. 1 is front view of the bird feeder according to the invention.
Figure 2:
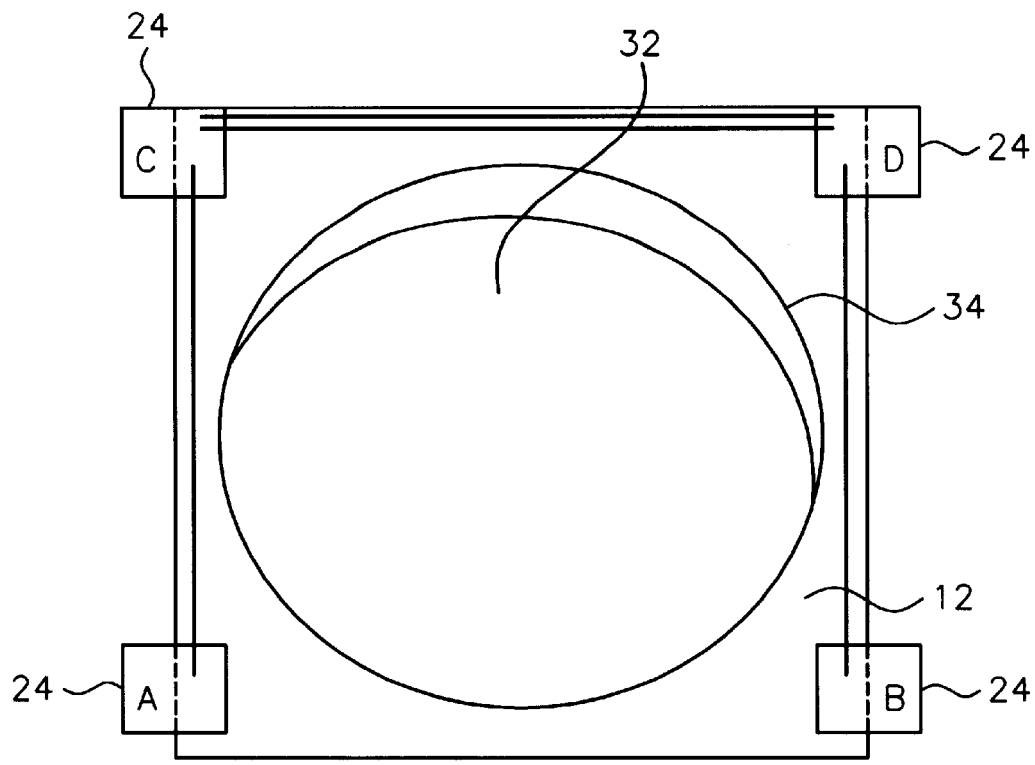
FIG. 2 is top view of the bird feeder with the roof removed.
Figure 3:
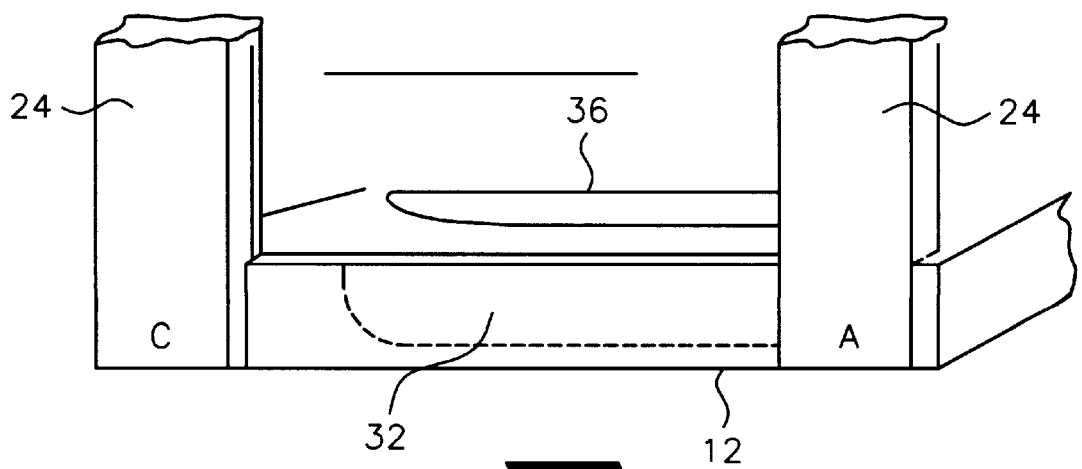
FIG. 3 is an enlarged partial front view of the bird feeder base and front supports.

Now with more particular reference to the drawings, shown is birdfeeder 10 having vanity-style base 12, roof 14, removable front 16 and window panels 17 forming sides 18. Front 16 has entrance openings 20 formed therein and landing perch 22 attached thereto.

Figure 4:
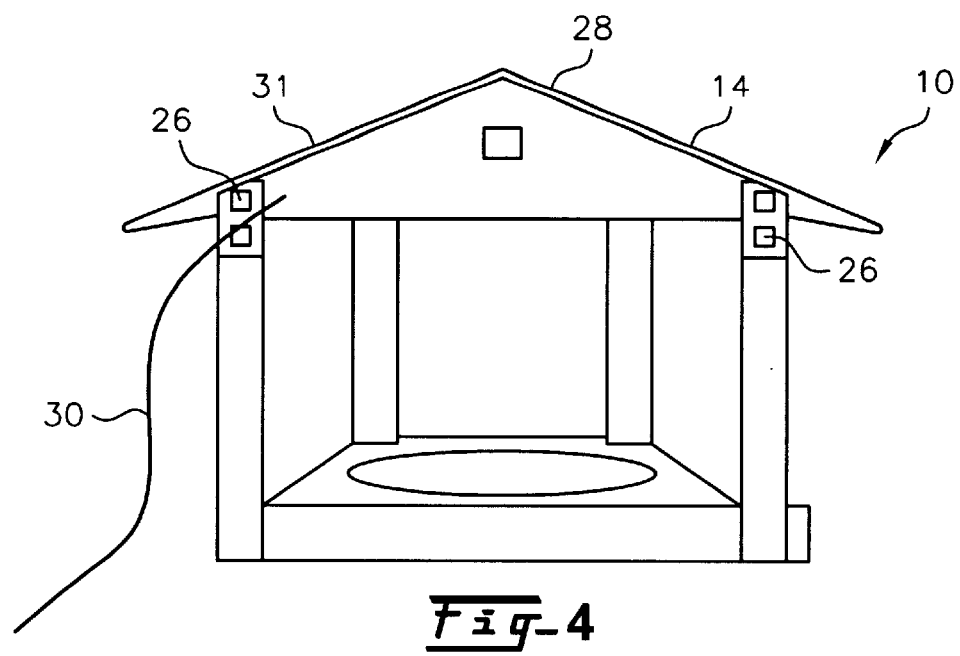
FIG. 4 is a back view of the feeder.
Figure 5:
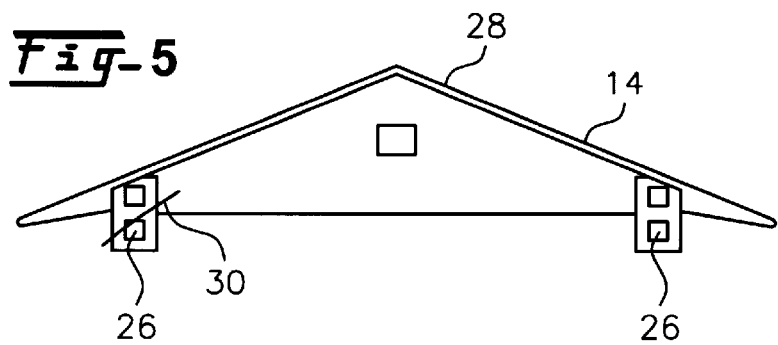
FIG. 5 is a back view of the roof removed from the bird feeder.
Figure 6:
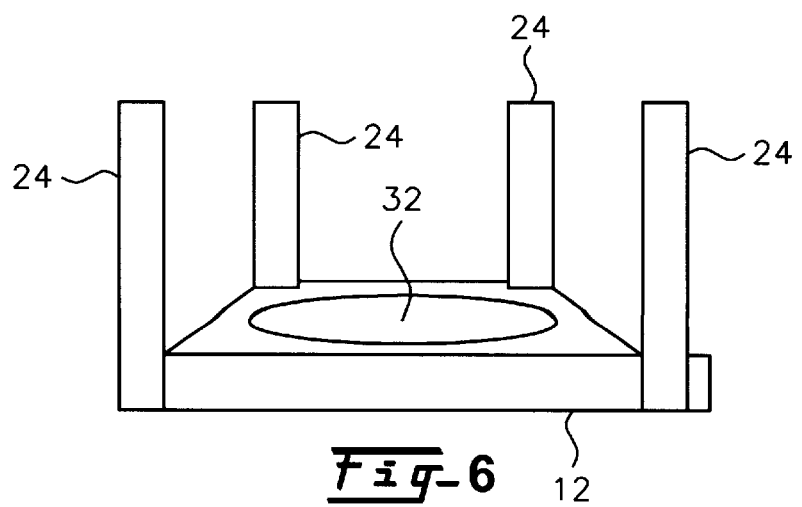
FIG. 6 is a partial isometric view of the base and side risers for the bird feeder, according to the invention.
Figure 7:
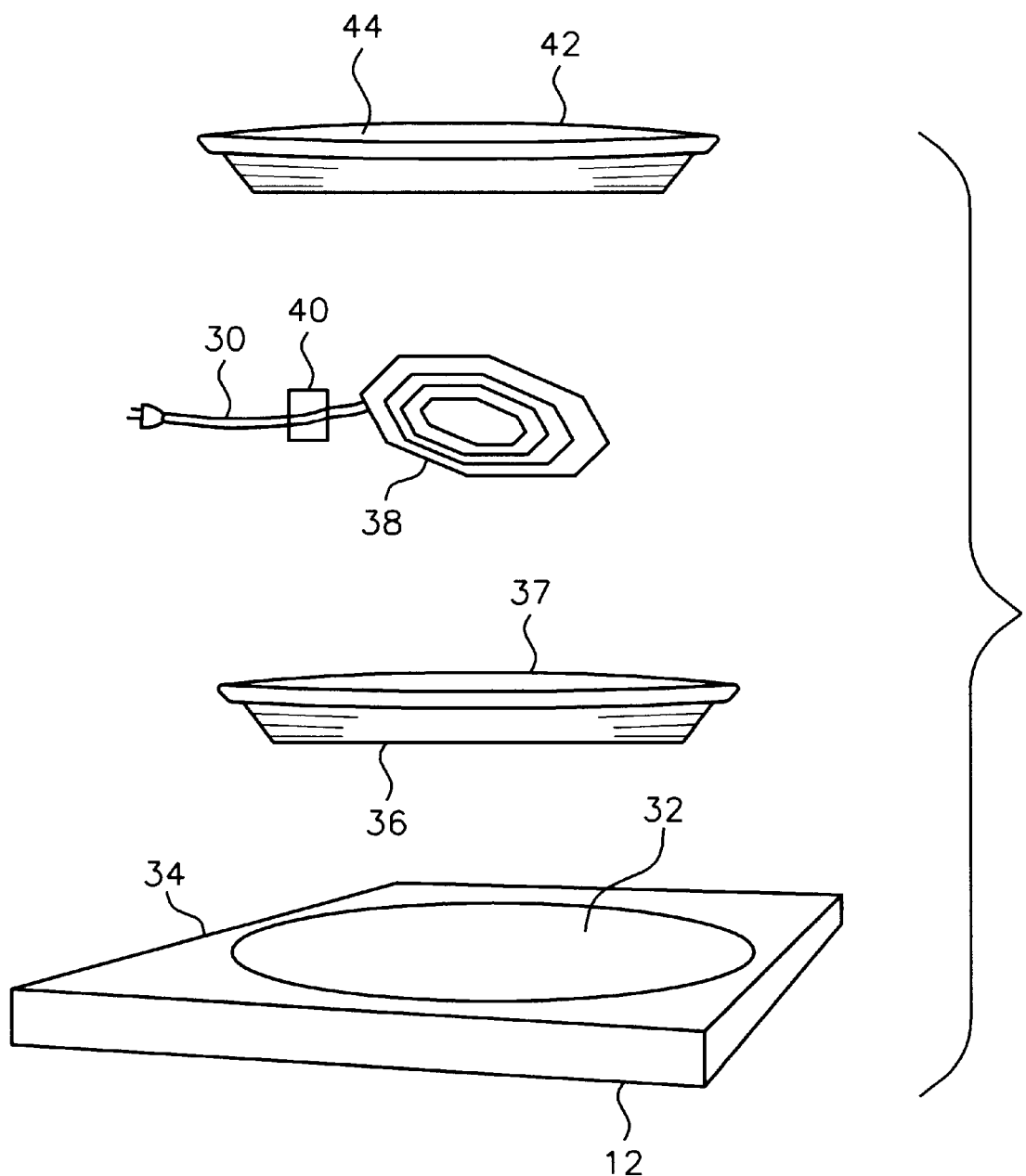
FIG. 7 is an exploded view showing the arrangement of food bowl, heater, water bowl and base.
Figure 8:
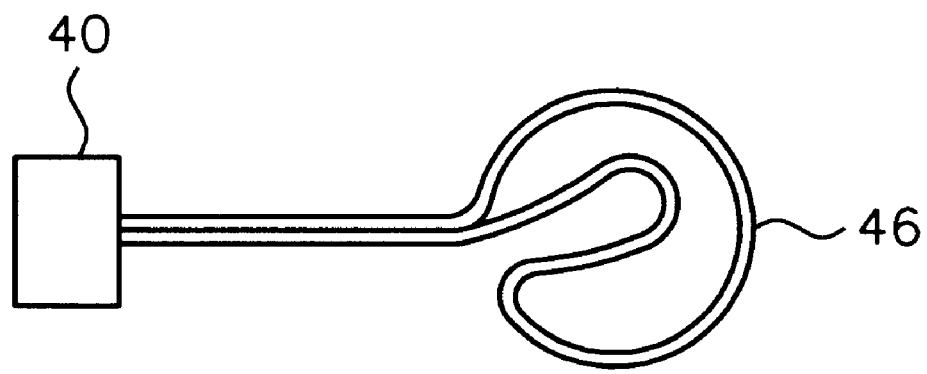
FIG. 8 is an isometric view of a cooling coil according to the invention.
Figure 9:
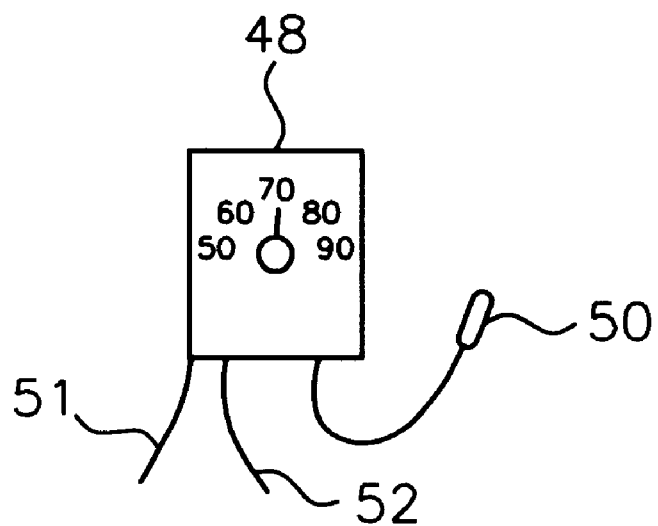
FIG. 9 is a front view of a thermostatic controller showing power cords and a temperature sensor.

Roof 14 is supported on base 12 by means of support means in the form of four side risers 24. Side risers 24 are held to roof 14 by fasteners 26, shown in FIGS. 4 and 5. Ventilation holes 28 are formed in the sides of roof 14. Electric cord 30 is inserted through electrical cord hole 31 which is formed in the back of roof 14.

Base 12, square in cross section, has cavity 32. Cavity 32 is filled with foam-in insulation 34. Water bowl 36 is inserted in cavity 32. A heating means in the form of electrical heater 38 is inserted into the water 37 in water bowl 36 during periods of cold weather. Rheostat 40 may be provided to regulate the temperature of electrical heater 38. Rheostat 40 may be located in any convenient location along the electric power line. For example, it may be located at bird feeder 10 to permit adjustment at feeder 10 where the temperature level can be observed, or rheostat 40 may be located in a nearby house so that heater temperature adjustments can be made without having to go out in the weather to feeder 10 to do so. Food bowl 42 is placed into water in water bowl 36 over electrical heater 38. Live bird feed 44 is put into food bowl 42. During periods of warm or hot weather, cooling means are provided by freezing the water 37 which is placed in the water bowl 36 to provide cooling below the ambient temperature to keep the live bird feed 44 alive and healthy.

Alternatively, cooling means in the form of refrigeration coil 46, of the type found in small office-size refrigerators, can be used to cool the water 37 in water bowl 36. Suitable external controls in the form of a thermostat 48 will be connected to the electrical circuits for heater 38 by means of cord 51, the connection for refrigeration coil 46 is by means of cord 52 to control the temperature to the desired value. Temperature sensor 50 would then be placed into the water 37 in water bowl 36 to sense the temperature of the water 37 and food bowl 42 with the thermostat supplying power to the heating or cooling system as required by the ambient temperature.

As a further alternative arrangement, the heater 38 and refrigeration coil 46 can be mounted directly on the food bowl 42 itself.

The foregoing specification sets forth the invention in its preferred, practical forms but the structure shown is capable of modification within a range of equivalents without departing from the invention which is to be understood is broadly novel as is commensurate with the appended claims.

What is claimed is:

1. A live feed bird feeder comprising a base;
a feed bowl on said base;
said feed bowl having means for heating and cooling live bird feed;
a control means for said heating means which is adapted to maintain the temperature of said live bird feed;
said heating means comprising an electrical heater and an adjustable rheostat.

2. The bird feeder recited in claim 1 further comprising a bowl adapted to contain water;
said feed bowl is placed into said water bowl;
said electrical heater is disposed in said water bowl;
said water bowl being filled with water;
said electrical heater and rheostat are operated during periods of cold weather to maintain the live bird feed above a freezing temperature to prolong the life and health of said live bird feed;
said cooling means being comprised of the water bowl being filled with ice during warm or hot periods of weather, thereby cooling said feed bowl to below ambient temperature which will prolong the life and health of said live bird feed.

3. The bird feeder recited in claim 2 further comprising said base having a cavity adapted to receive said water bowl;

said cavity having foam-in insulation therein.

4. The bird feeder recited in claim 1 further comprising a bowl adapted to contain water;

said feed bowl is placed into said water bowl;

said electrical heater is disposed in said water bowl;

said water bowl being filled with water;

said electrical heater and rheostat are operated during periods of cold weather to maintain the live bird feed above a freezing temperature to prolong the life and health of said live bird feed;

said cooling means being comprised of the said water bowl being filled with water; and a refrigerator evaporator coil being disposed in said water bowl and being operated during warm or hot periods of weather thereby cooling said feed bowl to a temperature below ambient, but above freezing, which will prolong the life and health of said live bird feed.

5. The bird feeder recited in claim 1 comprised of said feed bowl having a bottom and sides on which are mounted an electrical heater and refrigeration evaporator coil.

6. The bird feeder recited in claim 5 wherein said refrigeration coil is connected to a compressor and condenser forming a refrigeration system;

said electrical heater and refrigeration system are connected to control means to maintain the temperature of said live bird feed at a predetermined value, thereby prolonging the life and health of said live bird feed.

7. The bird feeder recited in claim 6 wherein said controls means comprises a thermostat.

8. The bird feeder recited in claim 1 wherein said bird feeder has a roof;

said base has support means adapted to support said roof over said base;

said roof has fastening means for attachment to said support means;

said roof has parts that overhang parts of said bird feeder providing weather protection for said bird feeder;

said support means comprise side risers extending upwardly from said base;

said bird feeder having panels attached with fastening means to said side risers on three sides.

9. The bird feeder recited in claim 8 wherein a removable front panel is supported between said side risers for access to the inside of said bird feeder.

10. The bird feeder recited in claim 9 wherein an entrance opening is provided in said bird feeder; and, said entrance opening is of a size adapted to accommodate the largest bird expected to use said bird feeder.

11. The bird feeder recited in claim 10 wherein at least two entrance openings are provided in said bird feeder;

said entrance openings are sized to admit only the desired species or smaller of said birds.

12. The bird feeder recited in claim 11 wherein one of said entrance openings is located above the other.

13. The bird feeder recited in claim 12 wherein said side and front panels comprise transparent windows.

14. A live feed bird feeder comprising a base;

a feed bowl on said base;

said feed bowl having a bottom, sides and means for heating and cooling live bird feed; and, said means for heating and cooling live bird feed comprising an electrical heater and a refrigeration evaporator coil mounted on said bottom and sides of said feed bowl.

15. The bird feeder recited in claim 14 further comprising a control means for said heating means which is adapted to maintain the temperature of said live bird feed;

said heating means comprising an electrical heater and an adjustable rheostat.

16. The bird feeder recited in claim 14 wherein said refrigeration coil is connected to a compressor and a condenser forming a refrigeration system;

said electrical heater and said refrigeration system are connected to a control means to maintain the temperature of said live bird feed at a predetermined value, thereby prolonging the life and health of said live bird feed.

17. The bird feeder recited in claim 14 wherein said bird feeder has a roof;

said base has support means adapted to support said roof over said base;

said roof has fastening means for attachment to said support means;

said roof has parts that overhang parts of said bird feeder providing weather protection for said bird feeder;

said support means comprise side risers extending upwardly from said base; and, said bird feeder having panels attached with fastening means to said side risers on three sides.

18. A live feed bird feeder comprising a base;

a feed bowl on said base;

said feed bowl having means for heating and cooling live bird feed;

said bird feeder has a roof;

said base has support means adapted to support said roof over said base;

said roof has fastening means for attachment to said support means;

said roof has parts that overhang parts of said bird feeder providing weather protection for said bird feeder;

said support means comprise side risers extending upwardly from said base; and, said bird feeder having panels attached with fastening means to said side risers on three sides.

19. The bird feeder recited in claim 18 further comprising a control means for said heating means which is adapted to maintain the temperature of said live bird feed;

said heating means comprising an electrical heater and an adjustable rheostat.

20. The bird feeder recited in claim 18 comprised of said feed bowl having a bottom and sides on which are mounted an electrical heater and a refrigeration evaporator coil.

* * * * *